(12) United States Patent
Hassani et al.

(10) Patent No.: US 10,106,080 B1
(45) Date of Patent: Oct. 23, 2018

(54) SYSTEMS AND METHODS FOR DELIVERING DISCRETE AUTONOMOUS IN-VEHICLE NOTIFICATIONS

(71) Applicant: Ford Global Technologies, LLC, Dearborn, MI (US)

(72) Inventors: Ali Hassani, Ann Arbor, MI (US); Michael Hrecznyj, Livonia, MI (US); Erick Michael Lavoie, Dearborn, MI (US); Alyssa Chatten, Royal Oak, MI (US); Thomas Joseph Hermann, Troy, MI (US); John Robert Van Wiemeersch, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/799,534

(22) Filed: Oct. 31, 2017

(51) Int. Cl.
    *G06Q 10/00* (2012.01)
    *B60Q 9/00* (2006.01)
    *B60N 2/90* (2018.01)
    *B60N 2/44* (2006.01)

(52) U.S. Cl.
    CPC ............... *B60Q 9/00* (2013.01); *B60N 2/44* (2013.01); *B60N 2/90* (2018.02); *B60N 2002/4485* (2013.01); *B60N 2002/981* (2018.02)

(58) Field of Classification Search
    USPC ................................................ 340/438, 944
    See application file for complete search history.

(56) References Cited

U.S. PATENT DOCUMENTS

| 7,604,168 B2 | 10/2009 | Eun et al. | |
| 2007/0265891 A1* | 11/2007 | Guo | G06Q 10/02 |
| | | | 705/5 |
| 2010/0121563 A1* | 5/2010 | Chavez | G06Q 10/08 |
| | | | 701/533 |
| 2014/0357261 A1* | 12/2014 | Chiu | H04W 4/029 |
| | | | 455/426.1 |

FOREIGN PATENT DOCUMENTS

| CN | 102785682 A | 11/2012 |
| CN | 103935384 A | 7/2014 |
| IN | 1506/CHE/2007 A | 9/2009 |
| JP | 5576647 B2 | 8/2014 |

OTHER PUBLICATIONS

Harman International Industries, *Individual Sound Zones*, 2015, 5 pages.
Kris Wouk, *Concert for One: Akoustic Arts A Speaker Beams Sound Straight to Your Ears*, retrieved from https://www.digitaltrends.com/home-theater/akoustic-arts-a-directonal-speaker-indiegogo/ on Oct. 31, 2017, 4 pages.

* cited by examiner

*Primary Examiner* — Brent Swarthout
(74) *Attorney, Agent, or Firm* — James P. Muraff; Neal, Gerber & Eisenberg LLP

(57) ABSTRACT

Method and apparatus are disclosed for providing discrete autonomous notifications to a passenger of a vehicle. An example vehicle includes a plurality of seats, a plurality of audio transducers, and a processor. The processor is configured to determine a passenger seat corresponding to a passenger having a predetermined destination, determine a notification based on the predetermined destination, and transmit, via one or more of the plurality of audio transducers, a notification to the passenger based on a determined passenger head position.

20 Claims, 5 Drawing Sheets though these drawings and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

SYSTEMS AND METHODS FOR DELIVERING DISCRETE AUTONOMOUS IN-VEHICLE NOTIFICATIONS

TECHNICAL FIELD

The present disclosure generally relates vehicle passenger comfort and safety and, more specifically, systems and methods for delivering discrete autonomous in-vehicle notifications.

BACKGROUND

Modern vehicles including shuttles, busses, trains, and others may transport several passengers simultaneously to several different locations. For example, an airport shuttle may pick up a group of people at a terminal, and transport the group to several different car rental locations or other destinations. These vehicles may also provide one or more notifications to the passengers that may indicate the next stop or other points of interest.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for providing personalized notifications to a particular passenger on a vehicle (which may include a car, bus, train, plane, or other means for transporting multiple passengers), using a directed audio signal meant to allow only the particular passenger to hear the notification. An example disclosed vehicle includes a plurality of seats, a plurality of audio transducers, and a processor. The processor is configured to determine a passenger seat corresponding to a passenger having a predetermined destination, determine a notification based on the predetermined destination, and transmit, via one or more of the plurality of audio transducers, a notification to the passenger based on a determined passenger head position. In some examples the notification may be transmitted such that it is heard only by the designated passenger, and not by other nearby passengers.

An example disclosed method of providing a notification to a vehicle passenger includes determining, by a vehicle processor, a passenger seat from a plurality of seats, the passenger seat corresponding to a passenger having a predetermined destination. The method also includes determining a notification based on the predetermined destination. And the method further includes transmitting, via one or more of a plurality of audio transducers, a notification to the passenger based on a determined passenger head position.

A third example may include means for determining, by a vehicle processor, a passenger seat from a plurality of seats, the passenger seat corresponding to a passenger having a predetermined destination. The third example may also include means for determining a notification based on the predetermined destination. And the third example may further include means for transmitting, via one or more of a plurality of audio transducers, a notification to the passenger based on a determined passenger head position.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
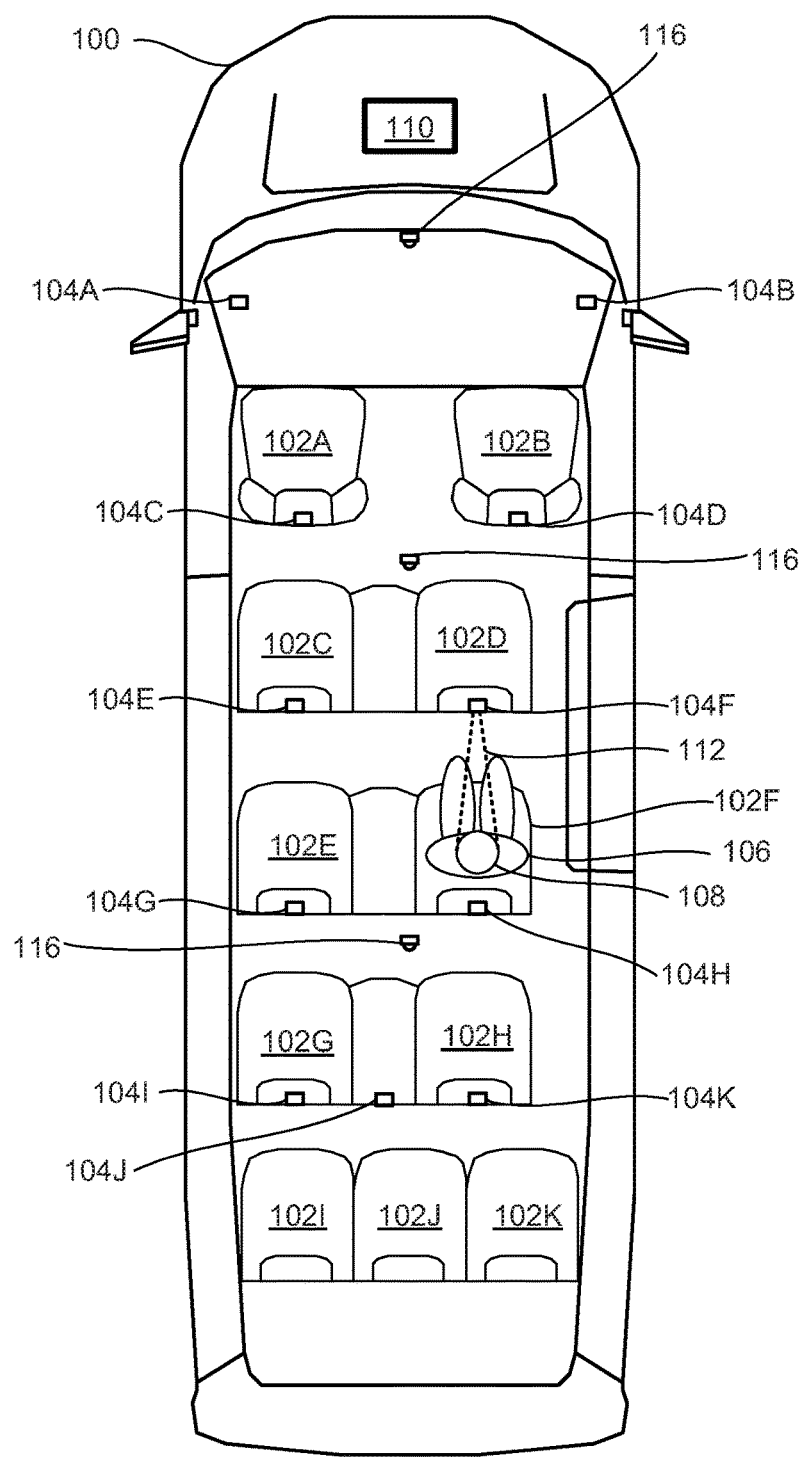
FIGS. 1A and 1B illustrate an example vehicle having respective speaker configurations according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, some vehicles are designed or configured to transport groups of people from one or more starting points to one or more destinations. These vehicles may include airport shuttles, busses, trains, planes, and more. In some cases, these vehicles may transport passengers long distances, taking up to an hour or more. It may be beneficial to provide individualized notifications to each rider based on one or more factors, such as the passenger destination and preferences. Further, it may be beneficial to provide notifications to a passenger so that only that passenger can hear, so as to avoid disturbing other passengers.

With these issues in mind, example embodiments disclosed herein may provide notifications via beamformed audio signals to particular passengers based on known destinations, preferences, and other factors. In one example, a passenger may input a destination via his or her mobile phone. The passenger may also indicate which seat in the shuttle he or she is sitting in. The vehicle may then determine when a particular notification should be provided, such as when there are ten minutes until arriving at the destination, when there is a point of interest outside the vehicle, or others. The vehicle may then use one or more audio transducers (i.e., speakers) to provide a narrow beam or localized audio signal that can be heard by the passenger, but does not disturb other passengers nearby. The narrow beam may be an ultrasonic wave having a frequency that cannot be heard as an individual harmonic.

Figure 1B:
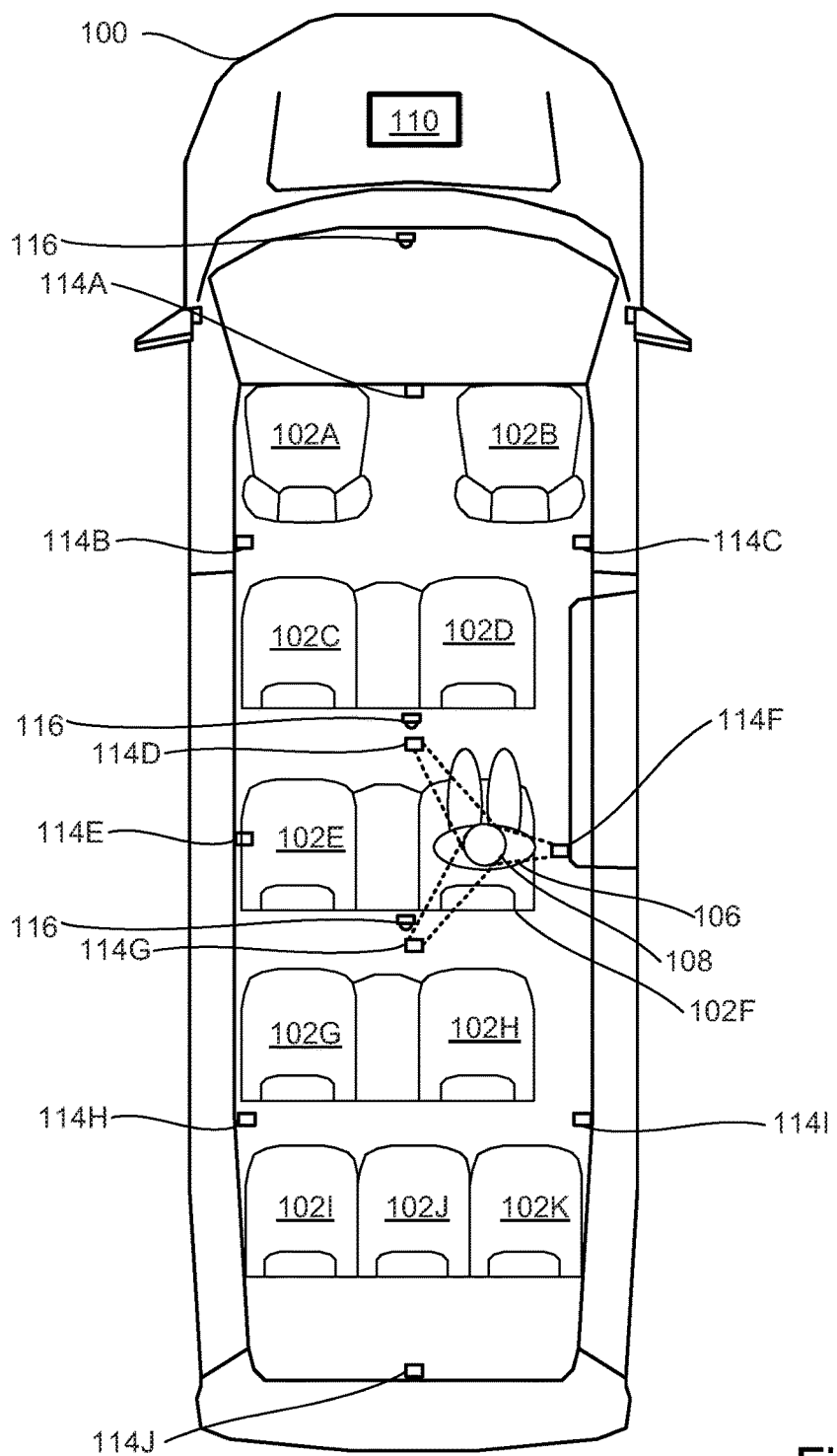

FIGS. 1A and 1B illustrate an example vehicle 100 having two different respective audio transducer configurations. Within this disclosure, examples may be described with reference to one or more "speakers" or "speaker configurations." It should be noted that the term speaker is used as an example, and other types of audio transducers may be used as well while remaining within the scope of this disclosure. FIG. 1A illustrates speakers 104A-K corresponding to seats 102A-K, while FIG. 1B illustrates speakers 114A-J distributed throughout vehicle 100. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 is shown as a shuttle having eleven seats. However it should be noted that the features described herein can be applied to other vehicles as well, including planes, trains, busses, and more. Further, vehicle 100 may include one or more electronic components (described below with respect to FIG. 2).

As shown in FIG. 1A, vehicle 100 may include a plurality of seats 102A-102K, speakers 104A-104K, and a processor 110. Seats 102A may be configured to each allow one passenger to sit. In other examples, a given seat may be a bench seat and may allow two or more passengers to sit.

Each speaker 104A-K and/or 114A-J may provide a narrow beam of audio directly to a passenger, through the use of one or more beamforming techniques. In some examples, two or more speakers may be used to provide localized audio to a passenger. This may be done by controlling each speaker to provide an audio signal such that the two signals constructively interfere at a given position in 3D space. This position may be nearby a passenger's head, allowing the passenger to hear the audio signal.

Figure 2:
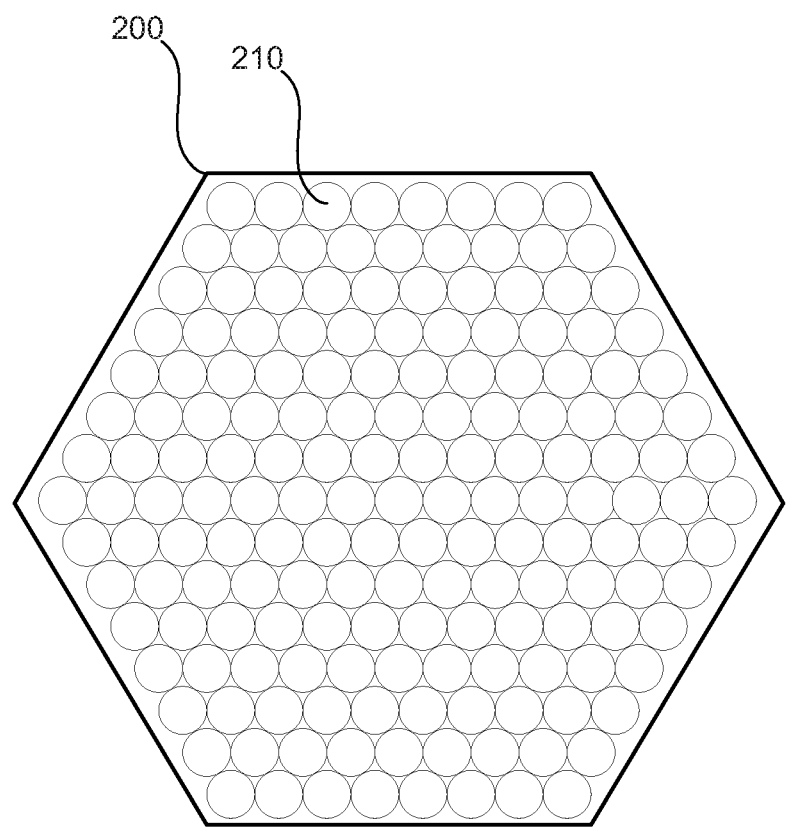
FIG. 2 illustrates an example speaker according to embodiments of the present disclosure.

FIG. 2 illustrates an example speaker 200 comprising a plurality of components 210 which may be turned on or off. The arrangement of components 210 that are turned on may direct the output audio beam in various directions.

Where two or more speakers are used to provide an audio signal to a passenger such as passenger 106, the output of each of the speakers may be configured to constructively interfere at a particular location near the passenger's head 108. In this manner, the passenger 106 will be able to hear the audio signal but passengers nearby will not.

In some examples the output from each individual speaker may be inaudible to a passenger, but the constructive interference of two or more outputs may combine to generate an audible signal. This may be the case, for example, where the output of each speaker is in a frequency range higher than what an ordinary human can hear, such as above 22 kHz. The constructive interference between the two signals may be lower than 22 kHz however, making the combined signal audible to the passenger. In some examples, the speakers and/or speaker outputs may be aimed or directed toward the head of the passenger.

Vehicle 100 may also include a processor 110 configured to carry out one or more functions or actions described herein. Processor 110 may be configured to determine a passenger seat corresponding to a given passenger.

In some examples, the passenger seat may be received by a communication module of vehicle 100. The communication module may transmit and/or receive one data with one or more remote computing devices to receive a passenger seat corresponding to a given passenger. The remote device may be, for example, a server or other cloud based device.

In some examples, the passenger seat may be received from a mobile device, or be determined based on an electronic coupling between the vehicle and a mobile device of the passenger. For instance, the mobile device may include an application that is configured to receive an input from the user indicating which seat the user is sitting in.

Alternatively or in addition, the passenger seat may be determined by the vehicle by using one or more vehicle antennas or systems configured to determine the position of the passenger's mobile device within the vehicle. For instance, a triangulation may be performed using one or more sensors, such as Bluetooth antennas. In other examples, one or more sensors may be coupled to the passenger seat itself, such as one or more near-field communication (NFC) or Bluetooth couplings. The processor 110 may determine a passenger seat corresponding to a passenger based on a coupling or pairing between the passenger's phone and the NFC sensor and/or Bluetooth sensor, for example.

In some examples, the processor 110 may also receive and/or determine a destination of passenger. The destination may be a predetermined destination input via an application on the mobile device.

In some examples, processor 110 may also be configured to receive other data corresponding to the passenger 106. For instance, a destination, an intent to sleep, and/or one or more options or preferences may be received. Where a passenger indicated his or her intent to sleep on the vehicle, one or more notifications may be prevented from being provided.

Processor 110 may also receive an intent to receive a wakeup notification from passenger 106. A wakeup notification may be provided by processor 110, and may provide an audio and/or haptic alert based on a distance or time until the vehicle reaches the passenger's destination. The haptic alert may also be provided where a passenger's heart rate has changed. A passenger may have a wearable device which may monitor his or her heart rate. In the even the passenger falls asleep, the passenger's heart rate may be measurably different. This information may be communicated to the vehicle, and used as input to determine when and whether to provide an alert. In some examples, the processor may first provide an audio alert, and if no change occurs (i.e., the passenger does not wake up), the processor may then provide a haptic alert by buzzing the headrest, seat, mobile device, wearable device, or other device.

Passenger 106 may also opt in to receiving one or more notifications about points of interest along the route, or opt in to receiving advertisements. If the passenger opts in to receiving advertisements, it may reduce a cost of the trip where the trip is not free.

Processor 110 may also be configured to determine a notification from a plurality of possible notifications to be provided to passenger 106 based on the predetermined destination of passenger 106. The notification may include a time to destination, having arrived at the destination, anticipated delays or traffic alerts, weather forecast at the destination, and more. Further, a wakeup call notification may be based on the predetermined destination in order to provide the passenger enough time to gather his or her things to be ready to depart.

In some examples, determining a particular notification to provide to the passenger may be done based on a determined vehicle location. For instance, a notification may include information about points of interest that are nearby the current vehicle location. Other notifications are possible as well.

Processor 110 may also be configured to determine a position of a head of the passenger corresponding to the determined notification. This may be done using one or more vehicle cameras 116, one or more ultrasonic, infrared, or other sensors positioned within vehicle 100 (e.g., within a headrest of the seat), using a wearable device on passenger 106 via a coupling to vehicle 100, or using one or more other sensors or devices.

The determined head position may account for slouching or a resting head on a window or on another passenger. The processor 110 may determine a passenger state (e.g., sleeping or not) based on eyelid detection using a vehicle camera. In other examples, the passenger state may be determined based on a position of the head 108 of passenger 106 with respect to a vertical state. Determining that the passengers head 108 is leaning over from vertical by a threshold amount may indicate that he or she is sleeping against a window or another passenger.

In some examples, the camera(s) 116 or other sensors may be configured to receive control information to control an audio system of the vehicle, so as to control a volume of the notifications, frequency of notifications, recalibrate a head position, and more. Further, the camera(s) may provide the ability for gesture tracking and/or gesture control. Other control mechanisms may include in seat controls on an arm rest, control via an application on the passenger's mobile device, and more.

Then based on the determined notification and the determined head position, processor 110 may be configured to transmit the notification to the passenger 106 using one or more of the speakers 104A-K or 114A-J.

FIG. 1A illustrates an example vehicle 100 in which each seat has a corresponding speaker. In this example, to provide a notification to passenger 106 sitting in seat 102F, speaker 104F may be used to provide a narrow audio beam 112 directed at the passenger's head 108. Speaker 104F may be configured to beamform the output to direct it toward the head 108 of the passenger 106.

In some examples, one or more speakers may be distributed throughout vehicle 100 as shown in FIG. 1B, as opposed to having one speaker dedicated per seat. In this disclosure, a speaker may include one or more audio sources, which may be used to beamform an output audio signal. As such, although examples are described having a single speaker that beamforms a signal, it should be noted that two or more audio sources may be required in order to beamform an audio signal. As such, the "speaker" may refer to a single unit or device having a plurality of audio sources. In this case, where a plurality of speakers are located at two or more locations within vehicle 100, the processor 110 may be further configured to transmit the notification by selecting two or more speakers from the plurality of speakers such that respective output signals from the two or more speakers constructively interfere at a location corresponding to the passenger head 108 position. The two or more speakers may be selected based on the passenger seat, the passenger head position, and/or one or more other factors.

As noted above, the signals from the two or more speakers may be inaudible or at an inaudible frequency on their own. But the combined signal resulting from the constructive interference may be audible to the passenger 106. In one example the output from each speaker may be above the frequency range audible to most humans (e.g., above 22 kHz). But the combined signal from two or more speakers may be lower, such that the passenger can hear.

In the example shown in FIG. 1B, speakers 114D, 114F, and 114G provide signals directed to the head 108 of passenger 106 such that the notification is audible to passenger 106, but is not audible to a passenger sitting in seat 102E.

Processor 110 may also be configured to determine that one or more notifications should not be provided to a given passenger. For instance a notification may be withheld based on the passenger being asleep, as determined by the camera or other vehicle sensor. Processor 110 may be configured to categorize one or more notifications. For instance, some notifications may be available when the passenger is awake, but not while the passenger is asleep. Other notifications may be available regardless of the passenger state, such as arrival notifications. The processor may determine, based on the passenger head position, that the passenger is in a sleep state; and responsively determine not to transmit a notification deemed unavailable in that state.

In some examples, processor 110 may provide a wakeup notification. The processor may track biometric data from a wearable device being worn by the passenger, such as a heart rate and/or eyelid position. Processor 110 may then provide a haptic alert through the seat, or through the passenger's wearable or mobile device.

In some examples, processor 110 may receive a "do not disturb" signal or preference indication. The processor 110 may responsively refrain from or determine not to send one or more notifications. Some notifications (such as an arrival notification) may still be sent.

Further, in some examples the processor 110 may receive data corresponding to vehicle noise, such as engine, motor, turbine, etc. noise, ground or air speed, and/or various other data which may be used to determine ambient or other cabin noise. One or more corresponding signals may be generated to counteract the noise, and provided along with one or more notifications. For instance, a 180 degree out of phase signal may be provided to cancel out the ambient noise.

Figure 3:
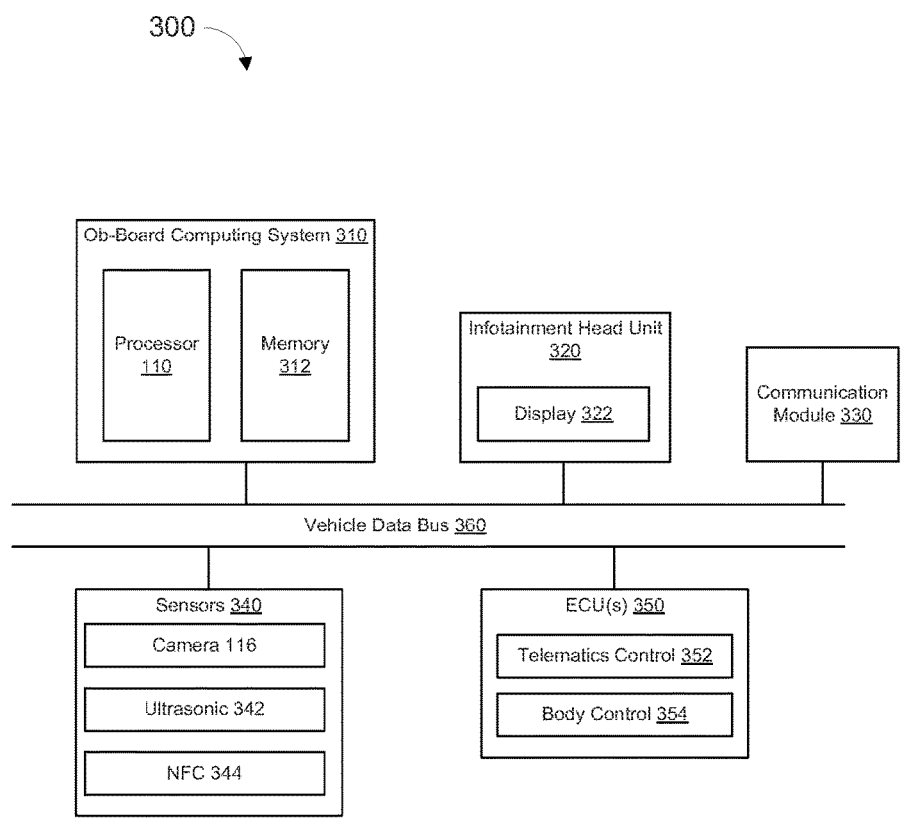
FIG. 3 illustrates an example block diagram of electronic components of the vehicle of FIGS. 1A and 1B.

FIG. 3 illustrates an example block diagram 300 showing electronic components of vehicle 100, according to some embodiments. In the illustrated example, the electronic components 300 include the on-board computing system 310, infotainment head unit 320, communication module 330, sensors 340, electronic control unit(s) 350, and vehicle data bus 360.

The on-board computing system 310 may include a microcontroller unit, controller or processor 110 and memory 312. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 320 may provide an interface between vehicle 100 and a user. The infotainment head unit 320 may include one or more input and/or output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 320 may share a processor with the on-board computing system 310. Additionally, the infotainment head unit 320 may display the infotainment system on, for example, a center console display 322 of vehicle 100.

Sensors 340 may be arranged in and around the vehicle 100 in any suitable fashion. In the illustrated example, sensors 340 include one or more camera(s) 116, ultrasonic sensor(s) 342, and NFC sensor(s) 344. Other sensors may be included as well.

The ECUs 350 may monitor and control subsystems of vehicle 100. ECUs 350 may communicate and exchange information via vehicle data bus 360. Additionally, ECUs 350 may communicate properties (such as, status of the ECU 350, sensor readings, control state, error and diagnostic codes, etc.) to and/or receive requests from other ECUs 350. Some vehicles 100 may have seventy or more ECUs 350 located in various locations around the vehicle 100 communicatively coupled by vehicle data bus 360. In some examples, on-board computing system 310 may be one of the many ECUs. ECUs 350 may be discrete sets of electronics that include their own circuit(s) (such as integrated circuits, microprocessors, memory, storage, etc.) and firmware, sensors, actuators, and/or mounting hardware. In the illustrated example, ECUs 350 may include the telematics control unit 352 and the body control unit 354.

The telematics control unit 352 may control tracking of the vehicle 100, for example, using data received by a GPS receiver, a communication module, and/or one or more sensors. The body control unit 354 may control various subsystems of the vehicle 100. For example, the body control unit 354 may control power a trunk latch, windows, power locks, power moon roof control, an immobilizer system, and/or power mirrors, etc. Other ECUs are possible as well.

Vehicle data bus 360 may include one or more data buses that communicatively couple the on-board computing system 310, infotainment head unit 320, communication module 330, sensors 340, ECUs 350, and other devices or systems connected to the vehicle data bus 360. In some examples, vehicle data bus 360 may be implemented in accordance with the controller area network (CAN) bus protocol as defined by International Standards Organization (ISO) 11898-1. Alternatively, in some examples, vehicle data bus 360 may be a Media Oriented Systems Transport (MOST) bus, or a CAN flexible data (CAN-FD) bus (ISO 11898-7).

Figure 4:
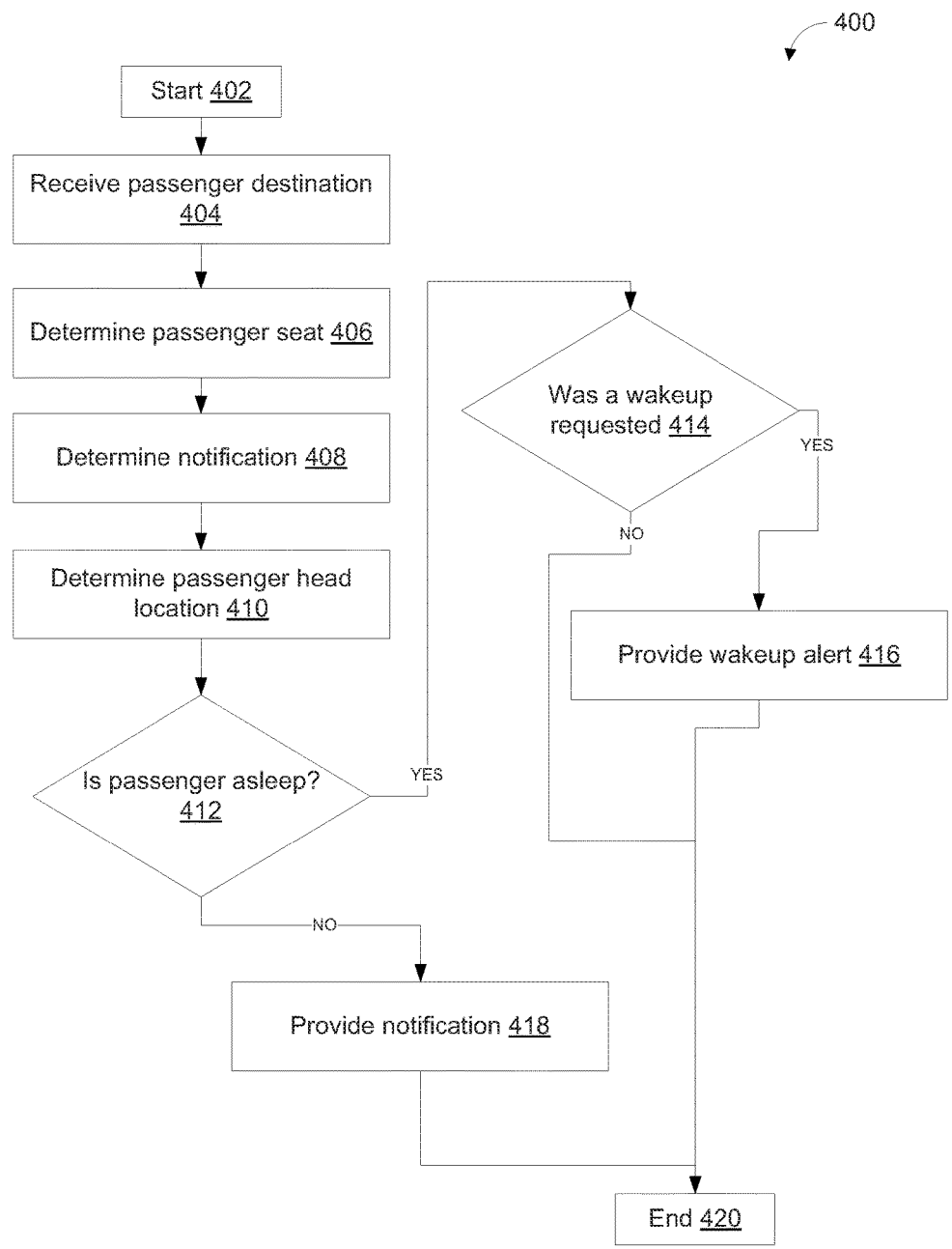
FIG. 4 illustrates a flowchart of an example method according to embodiments of the present disclosure.

FIG. 4 illustrates an example method 400 according to embodiments of the present disclosure. Method 400 may enable a vehicle to provide personalized autonomous notifications to a passenger using one or more speakers to provide directed audio signals. The flowchart of FIG. 4 is representative of machine readable instructions that are stored in memory (such as memory 312) and may include one or more programs which, when executed by a processor (such as processor 110) may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include receiving a passenger destination. The passenger destination may be received from a mobile device controlled by the passenger, or from a cloud based server, for example.

At block 406, method 400 may include determining a passenger seat. This may include determining which seat corresponds to the passenger. Where there are multiple passengers, it may also include determining which passenger corresponds to which seat. In some examples, this may be done via communication between the vehicle and the passenger's mobile device. The vehicle may include sensors configured to pair with the mobile device using one or more protocols such as Bluetooth, in order to match a seat with a passenger.

At block 408 method 400 may include determining a notification to be transmitted to the passenger. The notification may be any type of notification, and can include information such as a time to arrival, traffic updates, weather updates, and more.

At block 410, method 400 may include determining a passenger head location. This may include determining both a horizontal position as well as a vertical position and forward/backward position of the passengers head with respect to one or more positions in the vehicle. The position of the passenger's head may be used to direct or beamform audio from one or more speakers.

At block 412, method 400 may include determining whether the passenger is asleep. This may be determined via one or more vehicle sensors, such as cameras or other detection mechanisms. If the passenger is asleep, method 400 may determine whether a wakeup notification was requested at block 414.

If a wakeup notification was requested, method 400 may include providing a wakeup alert at block 416. The wakeup alert may include an audio signal as well as a haptic alert, such as a buzz or other physical movement of the headrest, arm rest, or other device. If no wakeup request was requested, method 400 may determine not to provide a wakeup alert, and method 400 may then end without transmitting an alert to the passenger.

However if the passenger is determined not to be asleep at block 412, method 40 may include providing the determined notification to the passenger. This may include beamforming or otherwise directing audio toward the head of the passenger. Method 400 may then end at block 420.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a plurality of seats;
   a plurality of audio transducers; and
   a processor configured to:
      determine a passenger seat corresponding to a passenger having a predetermined destination;
      determine a notification based on the predetermined destination; and
      transmit, via one or more of the plurality of audio transducers, the notification to the passenger based on a determined passenger head position.

2. The vehicle of claim 1, wherein the processor is further configured to determine the passenger seat based on an electronic coupling to a mobile device corresponding to the passenger.

3. The vehicle of claim 2, wherein the passenger seat is input by the passenger via an application on the mobile device.

4. The vehicle of claim 2, wherein the passenger seat is determined based on a determined position of the mobile device.

5. The vehicle of claim 2, wherein the passenger seat is determined based on a pairing of the mobile device to a sensor mounted to the passenger seat.

6. The vehicle of claim 1, wherein the predetermined destination is received by the processor from a mobile device corresponding to the passenger.

7. The vehicle of claim 1, wherein the notification is based on a determined vehicle location.

8. The vehicle of claim 1, wherein the plurality of audio transducers comprise a respective audio transducer corresponding to each of the plurality of seats, and wherein the processor is further configured to transmit the notification to the passenger based on the determined passenger head position by beamforming an output signal of a first audio transducer of the plurality of audio transducers.

9. The vehicle of claim 1, wherein the plurality of audio transducers are located at two or more locations within the vehicle, and wherein the processor is further configured to transmit the notification by selecting two or more audio transducers from the plurality of audio transducers such that respective output signals from the two or more audio transducers constructively interfere at a location corresponding to the determined passenger head position.

10. The vehicle of claim 9, wherein an output signal of each of the two or more selected audio transducers is inaudible, and wherein a constructively interfered signal from the two or more selected audio transducer is audible.

11. The vehicle of claim 1, wherein the processor is further configured to determine the passenger head position based on data from an ultrasonic sensor.

12. The vehicle of claim 1, wherein the processor is further configured to determine the passenger head position based on data from a camera.

13. The vehicle of claim 1, wherein the notification is a first notification, and wherein the processor is further configured to:
   determine, based on the passenger head position, that the passenger is in a sleep state; and
   responsively determine not to transmit a second notification.

14. A method of providing a notification to a vehicle passenger comprising:
   determining, by a vehicle processor, a passenger seat from a plurality of seats, the passenger seat corresponding to a passenger having a predetermined destination;
   determining the notification based on the predetermined destination; and
   transmitting, via one or more of a plurality of audio transducers, the notification to the passenger based on a determined passenger head position.

15. The method of claim 14, further comprising determining the passenger seat based on an electronic coupling to a mobile device corresponding to the passenger.

16. The method of claim 15, wherein the passenger seat is determined based on a determined position of the mobile device.

17. The method of claim 14, wherein the predetermined destination is received from a mobile device corresponding to the passenger.

18. The method of claim 14, wherein the plurality of audio transducers comprise a respective audio transducer corresponding to each of the plurality of seats, the method further comprising transmitting the notification to the passenger based on the determined passenger head position by beamforming an output signal of a first audio transducer of the plurality of audio transducers.

19. The method of claim 14, wherein the plurality of audio transducers are located at two or more locations within a vehicle, the method further comprising transmitting the notification by selecting two or more audio transducers from the plurality of audio transducers such that respective output signals from the two or more audio transducers constructively interfere at a location corresponding to the determined passenger head position.

20. The method of claim 14, wherein the notification is a first notification, the method further comprising:
   determining, based on the passenger head position, that the passenger is in a sleep state; and
   responsively determining not to transmit a second notification.

* * * * *